US011326653B2

(12) United States Patent
Watanabe et al.

(10) Patent No.: US 11,326,653 B2
(45) Date of Patent: May 10, 2022

(54) CYLINDRICAL COMPONENT FOR HOLDING CLUTCH PLATES AND PRESS MOLDING METHOD THEREFOR (71) Applicant: UNIPRES CORPORATION, Yokohama (JP)

(72) Inventors: Daichi Watanabe, Fuji (JP); Masamichi Miwa, Fuji (JP); Ryosuke Suzuki, Fuji (JP); Hideyuki Nezu, Fuji (JP)

(73) Assignee: UNIPRES CORPORATION, Yokohama (JP)

( * ) Notice: Subject to any disclaimer, the term of this patent is extended or adjusted under 35 U.S.C. 154(b) by 12 days.

(21) Appl. No.: 16/639,256

(22) PCT Filed: Aug. 10, 2018

(86) PCT No.: PCT/JP2018/030075
§ 371 (c)(1),
(2) Date: Feb. 14, 2020

(87) PCT Pub. No.: WO2019/035422
PCT Pub. Date: Feb. 21, 2019

(65) Prior Publication Data
US 2020/0246857 A1 Aug. 6, 2020

(30) Foreign Application Priority Data

Aug. 18, 2017 (JP) .............................. JP2017-158233

(51) Int. Cl.
*F16D 25/12* (2006.01)
*B21D 17/02* (2006.01)
(Continued)

(52) U.S. Cl.
CPC ........... *F16D 25/123* (2013.01); *B21D 17/02* (2013.01); *B21D 22/30* (2013.01); *F16D 13/60* (2013.01);
(Continued)

(58) Field of Classification Search
CPC ............... F16D 25/0638; F16D 25/123; F16D 2250/0023
See application file for complete search history.

(56) References Cited

U.S. PATENT DOCUMENTS 2,979,176 A * 4/1961 Voth ..................... F16D 25/0638
192/48.613
5,706,694 A * 1/1998 Bhookmohan ........ B21D 53/28
192/70.12
(Continued)

FOREIGN PATENT DOCUMENTS

DE 10 2014 224 368 A1 9/2015
JP S63-210420 A 9/1988
(Continued)

OTHER PUBLICATIONS

International Search Report with English translation and Written Opinion issued in corresponding application No. PCT/JP2018/030075 dated Oct. 23, 2018.
(Continued)

*Primary Examiner* — David R Morris
(74) *Attorney, Agent, or Firm* — Foley & Lardner LLP (57) ABSTRACT A clutch hub which is engaged with the clutch plates in an outer circumference is a press-molding article made from one steel sheet. In its inner circumferential surface, plural oil grooves for cooling the clutch plates, which are extended to a shaft direction and have a space in a circumferential direction. Each of dams as a press-molding portion extending to radial inward is formed at an end portion of each of (Continued)

the oil groove. The dams include an upright front surface and a back surface, and the bottom surfaces and both side surfaces of the oil grooves are integrated with the dams at the front surface side and the back surface side.

5 Claims, 9 Drawing Sheets

(51) Int. Cl.
    *B21D 22/30*          (2006.01)
    *F16D 13/60*          (2006.01)
    *F16D 13/74*          (2006.01)
    *F16D 25/0638*       (2006.01)

(52) U.S. Cl.
    CPC ......... *F16D 13/74* (2013.01); *F16D 25/0638* (2013.01); *F16D 2250/0023* (2013.01)

(56) References Cited

U.S. PATENT DOCUMENTS

| | | | | |
|---|---|---|---|---|
| 5,806,645 | A * | 9/1998 | Bhookmohan | B21D 53/28 |
| | | | | 192/113.34 |
| 6,189,669 | B1 * | 2/2001 | Kremer | F16D 25/0638 |
| | | | | 188/264 E |
| 6,332,521 | B1 * | 12/2001 | Shoji | F16D 25/0638 |
| | | | | 192/55.61 |
| 6,401,896 | B1 * | 6/2002 | Schnepf | F16D 13/74 |
| | | | | 192/113.34 |
| 2001/0002641 | A1 * | 6/2001 | Kato | F16D 13/648 |
| | | | | 192/70.14 |
| 2005/0016813 | A1 * | 1/2005 | Watanabe | F16D 25/0638 |
| | | | | 192/70.12 |
| 2005/0183925 | A1 * | 8/2005 | Ichikawa | F16D 25/0638 |
| | | | | 192/85.41 |
| 2006/0054448 | A1 | 3/2006 | Miyazaki | |
| 2008/0105513 | A1 * | 5/2008 | Miyazaki | F16D 25/123 |
| | | | | 192/113.34 |
| 2008/0121488 | A1 * | 5/2008 | Miyazaki | F16D 25/0638 |
| | | | | 192/70.12 |
| 2008/0142331 | A1 * | 6/2008 | Miyazaki | F16D 13/54 |
| | | | | 192/70.12 |
| 2008/0264746 | A1 * | 10/2008 | Simpson | F16D 25/12 |
| | | | | 192/3.33 |
| 2009/0250305 | A1 * | 10/2009 | Sawayanagi | F16D 25/123 |
| | | | | 192/70.12 |
| 2012/0080284 | A1 | 4/2012 | Torii et al. | |
| 2019/0277349 | A1 * | 9/2019 | Kasahara | F16D 25/14 |
| 2020/0116208 | A1 * | 4/2020 | Riedisser | F16D 13/72 |

FOREIGN PATENT DOCUMENTS

| | | |
|---|---|---|
| JP | H05-164141 A | 6/1993 |
| JP | H5-231446 A | 9/1993 |
| JP | H07-133830 A | 5/1995 |
| JP | H9-310745 A | 12/1997 |
| JP | 2000-516695 A | 12/2000 |
| JP | 2006-77888 A | 3/2006 |
| JP | 2013-249871 A | 12/2013 |

OTHER PUBLICATIONS

Extended European Search Report issued in corresponding European Patent Application No. 18845863.2 dated Mar. 10, 2021.

* cited by examiner

CYLINDRICAL COMPONENT FOR HOLDING CLUTCH PLATES AND PRESS MOLDING METHOD THEREFOR

TECHNICAL FIELD

The present invention relates to a cylindrical component for holding clutch plates and a press molding method therefor, and the cylindrical component for holding the clutch plates can be used in a clutch hub and the like in a transmission for a vehicle.

BACKGROUND ART

A clutch used in a transmission for a vehicle includes a clutch hub for installing a clutch pack. The clutch hub is a press molding article made from a steel sheet, and includes a plate portion extended from a boss on a rotational shaft in a radial direction, and a cylindrical portion extended from the plate portion in an axial direction. The cylindrical portion alternately forms projections to radial outward which are extended to a longitudinal direction, and projections to radial inward which are extended to the longitudinal direction, in a circumferential direction. In an outer circumference of the cylindrical portion, the depressions extended in the longitudinal direction between the adjacent projections to radial outward are engaged with projections in an inner circumference of clutch plates so that the clutch plates slidably move in the longitudinal direction. In an inner circumference of the cylindrical portion, the depressions extended in the longitudinal direction between the adjacent projections to radial inward are formed as oil grooves for circulating cooling oil (clutch oil) of the clutch plates.

In a slip mode of the clutch, although the clutch plates generate a friction heat, the clutch plates prevent from overheat by performing the cooling, using the clutch oil. That is, the clutch oil from oil supply grooves in a center of the rotational shaft is circulated in the oil supply grooves in the longitudinal direction via the plate portion of the clutch hub under centrifugal force, and is discharged from an end of the oil supply grooves. In order to enhance a cooling efficiency, it is desired that the clutch oil is retained by the oil grooves and a flow rate to the clutch pack sliding portion increases.

As the technology for extending the retention time of the lubricant oil or the cooling oil in the oil grooves, it is proposed that dams (dam structure portions) are formed in the end of the oil grooves in the longitudinal direction at the inner circumference of the cylindrical portion of the clutch hub (Patent Document 1). In this conventional technology, in order to form the dams, press molding of the clutch hub from the steel sheet is performed, and then a pressing process (stamping) to the end surface of the cylindrical portion by the punches is performed. Thus, when pressing by using the punches, in an outer circumference, the clutch hub is supported by an annular holding member having a depression and projection shape in an inner circumference which is complementary to the clutch hub. In an inner circumference, the clutch hub is supported by an annular holding member having an outer circumferential surface along an inscribed circle of the oil supply grooves. In this state, the punches are pressed to the axial direction by the end surface of the projection in the cylindrical portion of the clutch hub. Since the material is plastic-flown to radial inward, which is a free portion, due to the deformation, the dams which are the extended portion to radial inward against the general bottom surface of the oil grooves, can be formed.

As well, a forward-reverse switching mechanism for a continuously variable transmission (CVT) comprising the clutch hub as an embodiment of the cylindrical article for holding the clutch plates of the present invention is disclosed in Patent Document 2. Further, a reverse clutch is disclosed in Patent Document 3.

THE LIST OF PRIOR ART DOCUMENTS

Patent Documents

Patent Document 1: Japanese Unexamined Patent Publication No. 2000-516695 A
Patent Document 2: Japanese Unexamined Patent Publication No. 2013-249871 A
Patent Document 3: Japanese Unexamined Patent Publication No. H09-310745 A

SUMMARY OF THE INVENTION

Problems to be Solved by the Invention

In the prior art, the back surface side of the punch is a free portion, the material flow when pressing by the punches, basically is occurred in the axial direction which is a moving direction of the punches, and the pads (the excessive material) are occurred in the radial direction outwardly. The cross-sectional shape of the dams when the process of the punches is completed, is stood up against the radial direction in the front surface side which is in contact with the punches, and is a largely inclined shape, which is a thickest in the bottom surface side of the oil grooves and becomes thinner toward radial inward, in the back surface side. The above shape is understandably shown in FIG. 3 of Patent Document 1. From a viewpoint of the flow of the clutch oil in the oil grooves, such a cross-sectional shape of the dams is a shape that the resistance of the flow becomes small. From a viewpoint of improving the cooling efficiency of the clutch plates by extending the retention time of the clutch oil using the dams, the above shape is not ideal. The present invention has been developed in view of the above-described technical problems of the prior art, and an object of the present invention is to extend the retention time of the clutch oil in the dams and enable to efficiently cool the clutch plates.

Means for Solving the Problems

According to the present invention, a cylindrical component for holding clutch plates which is formed by press-molding a steel sheet, comprising a plate portion extended in a radial direction against a rotational shaft, and a cylindrical portion extended from the plate portion to an axial direction, wherein the cylindrical portion alternately forms projections to radial outward which are extended to a longitudinal direction, and projections to radial inward which are extended to the longitudinal direction, in a circumferential direction, wherein, in an outer circumference of the cylindrical portion, depressions extended in the longitudinal direction between the adjacent projections to radial outward are engaged with projections in an inner circumference of the clutch plates so that the clutch plates slidably move in the longitudinal direction, wherein, in an inner circumference of the cylindrical portion, depressions extended in the longitudinal direction between the adjacent projections to radial inward are formed as oil grooves for circulating cooling oil of the clutch plates, wherein the cylindrical portion comprises dams as a press-molding portion which are spaced from the plate portion and are slightly spaced from an end portion of the cylindrical portion of a spacing side to the plate portion side, ensure to integrate bottom surfaces and both side surfaces of the oil grooves with the dams, and are extended to radial inward, and wherein the dams have a steep shape so as to retain the oil which is circulated on the oil grooves in a back surface side.

It is preferred that the molding surface of the back surface side of the dams has an almost upright surface as long as attaching and detaching the molding tool is not prevented after the press processing is performed. Further, it is preferred that the angle be in a range between 90 [deg] and 100 [deg] for a reference line parallel to a center line of the cylindrical component when the angle is measured from an exterior of the clutch hub to an interior.

When press-molding the dams, the cylindrical component as a work is supported by an outer pressing tool having an inner circumferential shape which is complementary to the outer circumferential shape thereof, and comprises punches which are disposed opposite to the axial direction against the end surface of the cylindrical portion from an exterior, and inner pressing tools which are disposed opposite to the radial direction toward the bottom surfaces of the oil grooves. Press-molding of the dams can be performed by abutting the inner pressing tools to the bottom surfaces of the oil grooves, pressing the cylindrical portion from the end surface to the axial direction by the punches, and flowing the material of the work between each of the punches and each of the inner pressing tools.

Effects of the Invention

According to the present invention, the dams have press molding surfaces not only on the front surface but also on the back surface by the molding tools. Therefore, since the back surface of the dams can have a steep shape (is not sagged) as long as the operation of attaching and detaching the molding tool is not prevented after the back surface of the dams is press-molded, the retention of the flow of the clutch oil in the oil grooves by the dams can effectively be occurred, and the desired cooling of the clutch plates using the clutch oil can be performed.

BRIEF DESCRIPTION OF THE DRAWINGS

In the accompanying drawings:

FIGS. 6A and 6B are vertical cross-sectional views of the molding apparatus, are plan views of the apparatus which performs the press-molding of the dams using the work shown in FIG. 3, and are depicted substantially taken along a line VI-VI in FIG. 5, FIG. 6A shows a state that dies are opened, and FIG. 6B shows a state that the press process is slightly progressed;

FIGS. 7C and 7D are vertical cross-sectional views of the molding apparatus as well as FIGS. 6A and 6B, FIG. 7C shows a state that the press process is further progressed, and FIG. 7D shows a state that the molding of the dams is completed;

FIGS. 8A, 8B and 8C are schematic diagrams showing the molding process of the dams to the work by the molding apparatus of FIGS. 5, 6A and 6B (7C and 7D) with reference to one dam in one oil groove, FIG. 8A shows a position relationship between the molding tool and the work before molding, FIG. 8B shows the above position relationship during molding, and FIG. 8C shows the above position relationship after the molding is completed;

FIGS. 9A, 9B and 9C are schematic diagrams showing a position relationship of the molding tool to the work in the prior art as well as FIGS. 8A, 8B and 8C, FIG. 9A shows the above position relationship before molding, FIG. 9B shows the above position relationship during molding, and FIG. 9C shows the above position relationship after the molding is completed.

MODE FOR CARRYING OUT THE INVENTION

Figure 1:
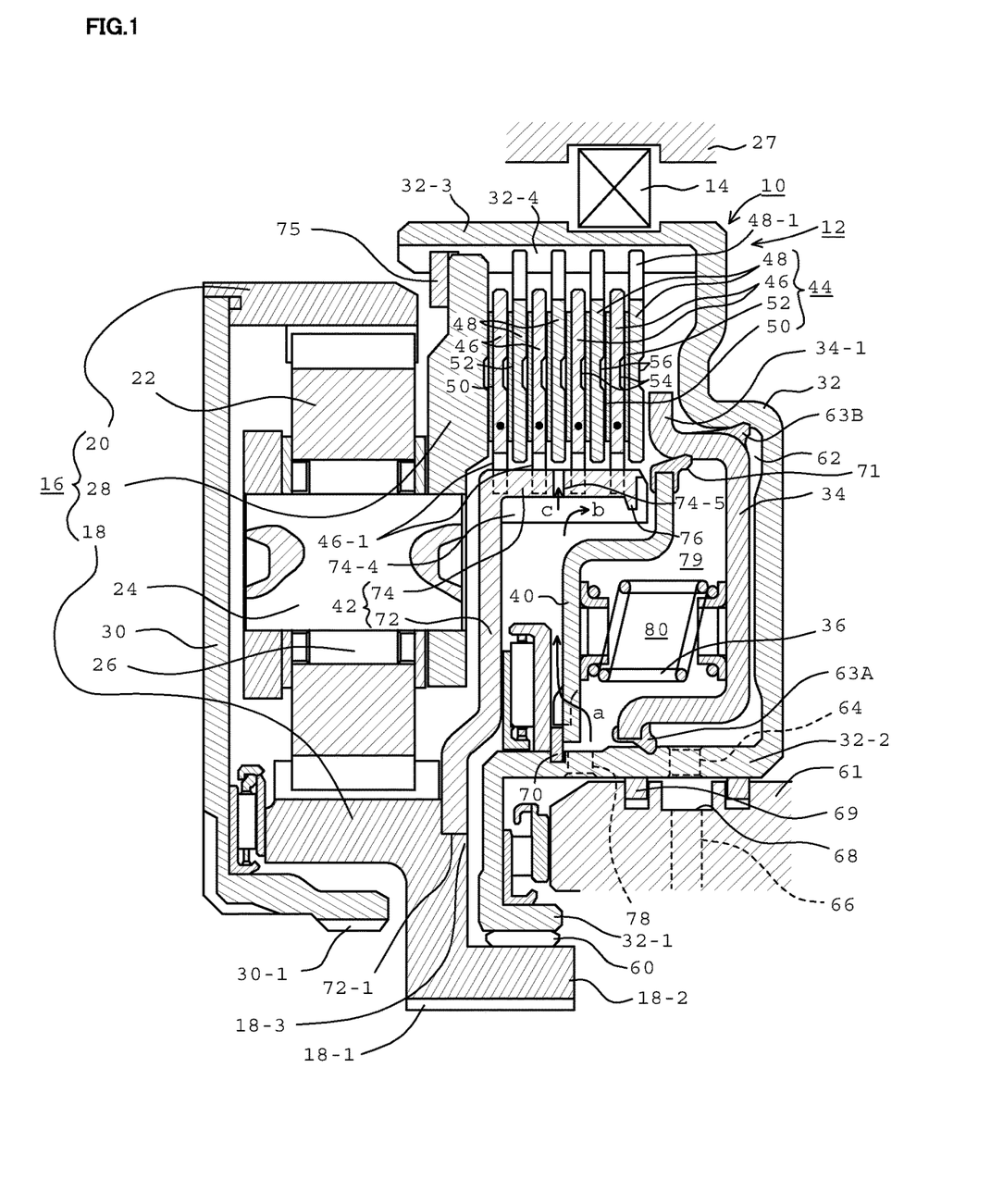
FIG. 1 is a cross-sectional view showing a forward-reverse switching mechanism in a vehicle comprising a clutch hub, as an embodiment of the present invention.

Next, an embodiment of the present invention will be described. In FIG. 1, a reference numeral 10 denotes a planetary gear-type forward-reverse switching mechanism of a vehicle comprising a belt-type continuously variable transmission (CVT). As disclosed in Patent Document 2, the forward-reverse switching mechanism 10 is disposed on a drive train between an engine and the CVT.

The forward-reverse switching mechanism 10 comprises a forward drive clutch 12 and a reverse drive clutch 14. The forward drive clutch 12 shows a detailed configuration. For simplicity, the reverse drive clutch 14 shows only an outline configuration. The forward-reverse switching mechanism 10 further comprises a planetary gear mechanism 16 in addition to the above forward drive clutch 12 and the above reverse drive clutch 14. The planetary gear mechanism 16 comprises well-known three rotational elements which are a sun gear 18, a ring gear 20, and a carrier 28 in which plural planetary gears 22, which are engaged with the sun gear 18 at an inner portion, are engaged with the ring gear 20 at an outer portion, and are disposed in a circumferential direction with an equal interval, are rotatably supported by a planetary gear shaft 24 and a needle bearing 26. The sun gear 18 has a spline 18-1 in an inner circumferential surface, and a rotational shaft (not shown) which is engaged with the spline 18-1 is coupled with an engine side. Thus, the sun gear 18 can receive a rotational driving force from the engine. An end plate 30 fixed to one end of the ring gear 20 has a spline 30-1 in an inner circumferential surface, and a shaft which is engaged with the spline 30-1 is coupled with the CVT side. Thus, the rotation in the forward direction or in the reverse direction is transmitted to the CVT.

The configuration of the forward drive clutch 12 in the forward-reverse switching mechanism 10 will be described. The forward drive clutch 12 comprises a clutch drum 32, a hydraulic pressure piston 34, a return spring 36, a spring receiving plate 40, a clutch hub 42 (which is a cylindrical component for holding clutch plates of the present invention), and a clutch pack 44. As described below, the clutch pack 44 comprises drive plates 46, driven plates 48, clutch facings 50 (the clutch plates of the present invention comprise the drive plates 46 and the clutch facings 50.) which comprise a friction material (whose materials are glass fiber or a resin), and are fixed to (only) one surface of the drive plate 46, clutch facings 52 (the clutch plates of the present invention comprise the drive plates 46 and the clutch facings 52.) which comprise the friction material, and are fixed to (is adhered to) (only) one surface of the driven plates 48. The drive plates 46 and the driven plates 48 are alternately disposed along the axial direction. The clutch facings 50 which are fixed to the one surface of the drive plate 46 and the clutch facings 52 which are fixed to the one surface of the driven plate 48 are alternately disposed in the axial direction between the drive plate 46 and the adjacent driven plate 48. As described below, since the carrier 28 of the planetary gear mechanism 16 receives a clutch engagement force through the clutch facing 50 which is fixed to the one surface of the most proximate drive plate 46, the carrier 28 is a component of the forward drive clutch 12 and serves as a function of the driven plates 48 in the clutch pack 44. Annular grooves 54 are circumferentially and concentrically formed on the other surface (the opposite surface) of the driving plates 46 which are not fixed to the clutch facings 50. Annular grooves 56 are circumferentially and concentrically formed on the other surface (the opposite surface) of the driven plates 48 which are not fixed to the clutch facings 52. These annular grooves 54 and 56 have a function that the clutch oil is retained, and can serve a decrease in a slide friction to the opposed clutch facing. In the present embodiment, as described above, the clutch pack 44 adopts a configuration that the clutch facings 50 and 52 are disposed on only the one surface of the drive plate 46 and the driven plate 48. The concept of the present invention can be adapted to the clutch pack that the clutch facings are disposed on the both surfaces of the drive plate and the driven plate.

The concrete structures of the above components that the forward-reverse switching mechanism 10 comprises, the coupling structures between the above components, and the position relationships between the above components will be described in detail. In FIG. 1, the clutch drum 32 has an inner circumferential cylindrical portion 32-1, an intermediate cylindrical portion 32-2 and an outer circumferential cylindrical portion 32-3. In the inner circumferential cylindrical portion 32-1, the clutch drum 32 is rotatably attached to a hub portion 18-2 of the sun gear 18 by a needle bearing 60. In the intermediate cylindrical portion 32-2, the clutch drum 32 is rotatably engaged with a drum support portion 61 which is protruded from a fixed side of the transmission case in a column shape. The hydraulic pressure piston 34 is movably disposed to the clutch drum 32 in the axial direction. A hydraulic pressure chamber 62 is formed between the hydraulic pressure piston 34 and the clutch drum 32 by being sealed by a cylindrical seal member 63A on the inner circumference and a cylindrical seal member 63B on the outer circumference. A hydraulic oil port 64 which is formed on the intermediate cylindrical portion 32-2 of the clutch drum 32 in the hydraulic pressure chamber 62 is opened. A hydraulic oil passage 66 and an outer circumferential annular groove 68 are formed in a drum support portion 61 which receives the clutch hydraulic oil from a hydraulic pump (not shown) for driving the clutch. In both sides of the annular groove 68, the annular groove 68 has a rotatable seal structure by a seal ring 69. Thereby, the introducing of the clutch hydraulic oil to the hydraulic pressure chamber 62 or the discharge of the clutch hydraulic oil from the hydraulic pressure chamber 62 through the annular groove 68 and the hydraulic oil passage 66 can be performed. Because a return spring 36 is disposed between the hydraulic pressure piston 34 and a spring receiving plate 40 and the spring receiving plate 40 is abutted to a snap ring 70 on the intermediate cylindrical portion 32-2 of the clutch drum 32, as shown in FIG. 1, the return spring 36 biases the hydraulic pressure piston 34 so that the hydraulic pressure piston 34 is abutted to an opposite surface of the clutch drum 32 (so that a volume of the hydraulic pressure chamber 62 becomes minimum). In a state of FIG. 1 that the hydraulic pressure of the hydraulic pressure chamber 62 is low, the outer circumferential driving portion 34-1 of the hydraulic pressure piston 34 is spaced from the clutch pack 44. In this state, the forward drive clutch 12 is a non-engaged state.

The driven plates 48 in the clutch pack 44 have a spline projection 48-1 in an outer circumference. The clutch drum 32 forms a spline groove 32-4 along a whole length in an axial direction of the inner circumferential surface of the outer circumferential cylindrical portion 32-3. By the engagement with the spline groove 32-4 and the spline projections 48-1, the drive plate 46 integrally rotates against the clutch drum 32 and can move in the axial direction. A clutch hydraulic oil introducing port 78 is formed in the intermediate cylindrical portion 32-2 of the clutch drum 32. The clutch hydraulic oil port 78 is opened to a canceller chamber 80 separated by the spring receiving plate 40 and the hydraulic pressure piston 34, in the spacing side from the hydraulic pressure chamber 62 with reference to the hydraulic pressure piston 34. The canceller chamber 80 generates a cancelled pressure when the hydraulic pressure piston 34 is retreated. In the outer circumference, the seal 71 seals the opposite surface of the hydraulic pressure piston 34. In the inner circumference, a gap is existed. Thereby, the clutch hydraulic oil supplied from the clutch hydraulic oil introducing port 78 is supplied to and is filled with an interior space of the clutch drum 32 except for the hydraulic pressure chamber 62, and the planetary gear mechanism 16 under the appropriate pressure.

Figure 2:
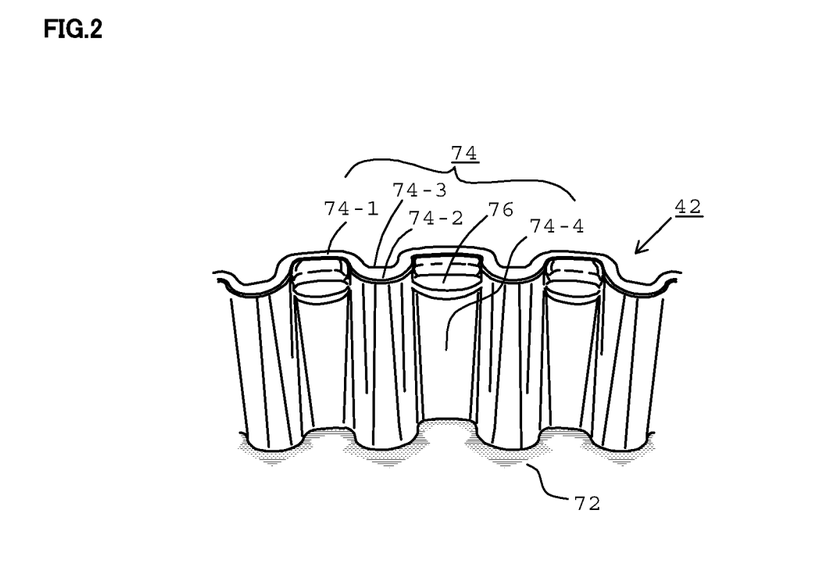
FIG. 2 is a partially perspective view showing the clutch hub, viewed from an opening end side.
Figure 3:
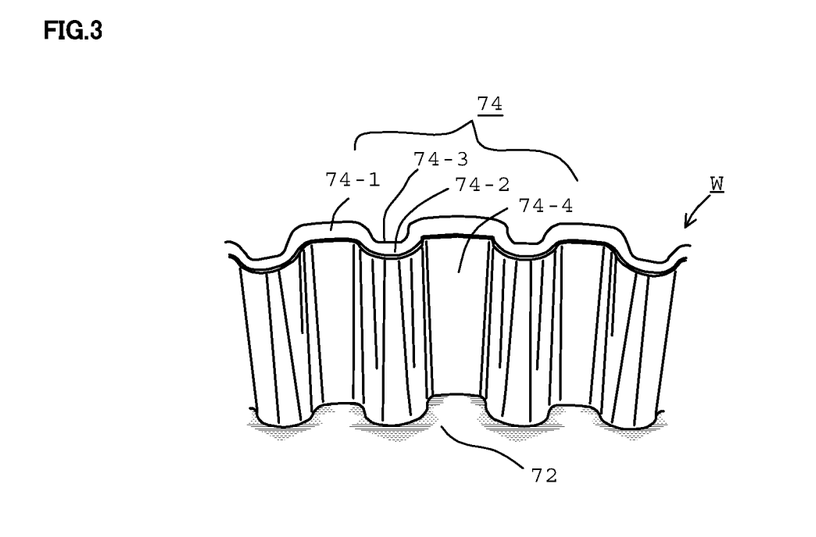
FIG. 3 is a partially perspective view showing a work before dams are not press-molded, from the same viewpoint as FIG. 2.

The clutch hub 42 which is the cylindrical component for holding the clutch plates according to the present invention is a press-molding article made from one steel sheet, and comprises a plate portion 72 extended to the radial direction against the rotational shaft, and a cylindrical portion 74 extended from the outer circumferential portion of the plate portion 72 to the axial direction. A central bore 72-1 of the plate portion 72 is inserted into the intermediate cylindrical portion 18-3 of the sun gear 18 and is welded. Thus, the plate portion 72 integrally rotates with the sun gear 18. FIG. 2 is a partially perspective view showing the clutch hub 42, substantially viewed from an opening end side of the cylindrical portion 74. The cylindrical portion 74 alternately forms the projections 74-1 to radial outward and the projections 74-2 to radial inward, which are extended toward the cylindrical portion 74 in the axial direction, in the circumferential direction. The depressions which are disposed between the adjacent projections 74-1 to radial outward in a circumferential direction and are served as the spline grooves 74-3, are formed. The spline projections 46-1 (FIG. 1) which are formed in the inner circumference of the drive plate 46 with an equal interval in the circumferential direction are engaged with these spline grooves 74-3. Thereby, the drive plate 46 integrally rotates with the clutch hub 42, and slidably moves to the clutch hub 42 in the axial direction. In FIG. 2, the depressions in the axial direction which are disposed between the adjacent projections 74-2 to radial inward in a circumferential direction and are served as the oil grooves 74-4 for cooling the clutch plates, are formed. As understood from FIG. 2, the oil grooves 74-4 are located in the inner surface side of the projections 74-1 to radial outward. As shown in FIG. 1, the oil holes 74-5 are opened in the intermediate portion of the axial direction, on the bottom surfaces of the respective oil grooves 74-4. The oil holes 74-5 penetrate the cylindrical portion 74 in a radial direction, are opened to the outer circumferential surface of the cylindrical portion 74, and can serve the supplying of the oil to the drive plate 46, the driven plate 48, the clutch facings 50 and 52 by which the clutch pack 44 is constituted. In FIG. 2, the dams 76 which are slightly spaced from the end surface of the cylindrical portion 74 of the clutch hub 42 to the plate portion 72 side and are located toward the bottom surface of the respective oil grooves 74-4, are formed so as to maintain the integration of the side surface and protrude to radial inward. The retention of the clutch oil in the oil grooves 74-4 are effectively occurred by the dams 76. The intention that the dams 76 are disposed is to enhance the cooling efficiency of the clutch plates, that is, the clutch pack 44. FIG. 2 is a schematic perspective view for visually clarifying the position relationship between the oil grooves 74-4 and the dams 76, and the oil holes 74-5 in FIG. 1 are not shown. Further, FIG. 3 is a schematic perspective view showing the shape of the clutch hub before molding the dams 76 by the punches (hereinafter referred to as a "work W"), from the same viewpoint as FIG. 2. As described below, the molding of the dams 76 by pressing the projections 74-1 in the work W to radial outward by using the punches on the opening side end surface of the cylindrical portion 74, is performed.

Figure 4:
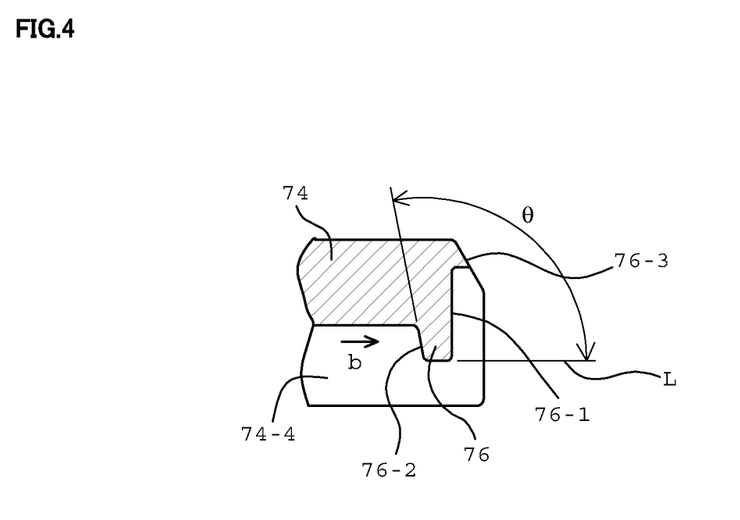
FIG. 4 is a partially enlarged view of FIG. 1 showing a shape of the dam in a front end portion of a cylindrical portion of the clutch hub.

FIG. 4 is an enlarged view showing a cross-sectional shape of the dam 76 in FIG. 1. The dam 76 comprises a front surface 76-1 (the molding surface by the punches) which is slightly retreated from the front surface of the cylindrical portion 74 to the axial direction and is stood up against the radial direction. The back surface 76-2 is a slightly inclined steep molding surface 76-2 (the molding surface by the inner pressing tools, as described below). The molding surface 76-2 has an angle θ to the inner circumferential surface of the oil groove 74-4 (the angle to the reference line L parallel to the center line is measured from an exterior of the clutch hub 42 to an interior) so as to be stood up as long as attaching and detaching the inner pressing tools 84 is not prevented after the dams are molded. In order to effectively retain the clutch oil using the dams 76, it is preferred that the angle θ be substantially 90 [deg]. In order to surely detach the inner pressing tool 84 after the dam 76 is molded, the appropriate angle which is up to substantially 100 [deg] is selected as the angle θ. The end surface 76-3 of the cylindrical portion 74 of the clutch hub is chamfered in the finishing process.

Flow of the clutch oil near the cylindrical portion of the clutch hub 42 according to the present invention will be described. In FIG. 1, the clutch hydraulic oil supplied from the clutch hydraulic oil introducing port 78 is circulated to a gap portion of the spring receiving plate 40 as shown by an arrow "a", is introduced into the cylindrical portion 74 of the clutch hub 42 under the centrifugal force, is introduced into the oil grooves 74-4 as shown by an arrow "b", is circulated to the oil holes 74-5 as shown by an arrow "c", and is introduced into the clutch pack 44.

By introducing the clutch control hydraulic pressure to the hydraulic pressure chamber 62, when the pressure becomes high and then is higher than a setting pressure of the return spring 36, the hydraulic pressure piston 34 moves toward the clutch pack 44 against the return spring 36. The outer circumferential driving portion 34-1 of the hydraulic pressure piston 34 is abutted to the most proximate driven plate 48 to the hydraulic pressure piston 34 of the clutch pack 44, and the drive plate 46 which is the farthest spaced from the hydraulic pressure piston 34 is abutted to the opposite surface of the carrier 28 through the clutch facing 50 which is fixed to the one surface of the drive plate 46. In the proximate side of the planetary gear mechanism 16, the carrier 28 is locked in the inner circumference of the outer circumferential cylindrical portion 32-3 of the clutch drum 32 by the snap ring 75. Therefore, when the hydraulic pressure to the hydraulic pressure chamber 62 becomes higher, the clutch pack 44 is engaged between the hydraulic pressure piston 34 and the carrier 28. Since the engaging of the clutch pack 44 is not strong, a slip engagement state that permits the slip of the one drive plate 46 to the adjacent drive plate 46 through the clutch facings 50 and 52 is achieved. Furthermore, in a case that the hydraulic pressure to the hydraulic pressure chamber 62 becomes higher than the above value, the clutch complete engaging state that does not permit the slip of the one drive plate 46 to the adjacent drive plate 46 can be achieved.

Due to the friction heat, the slip engagement operation of the clutch pack 44 causes an increase in the temperature of the drive plates 46 and the driven plates 48 by which the clutch pack 44 is constituted. The above increase in the temperature is suppressed by the cooling effect of the inflow clutch oil (the arrow "c") through the oil holes 74-5. The clutch oil which is circulated in the oil grooves 74-4 in the axial direction (the arrow "b") cools the drive plate 46 through the cylindrical portion 74 of the clutch hub 42. This also contributes the cooling of the overall clutch pack 44. According to the present invention, since the spacing side end portions of the respective oil holes 74-5 in the plate portion 74, that is, the dams 76 formed at the downstream side end portion in the flow direction "b" of the clutch oil have a steep surface, which is in contact with the flow "b" of the clutch oil, in the back surface of the dams 76, the steep surface is a large resistance of the flow of the clutch oil in the respective oil grooves 74-4, the retention time of the clutch oil in the oil grooves 74-4 is extended, and the cooling effect can be enhanced. In contrast, as described below in FIG. 9, in a case of the prior art of Patent Document 1, because a gradient of the back surface of the dams is gentle and the flow of the clutch oil smoothly climbs over the dams, the cooling effect from the clutch hub side is inadequate.

The reverse drive clutch 14 is only depicted in simplification, and the detailed structure is not shown. As well as the forward drive clutch 12, the reverse drive clutch 14 comprises the clutch pack which includes the drive plates, the driven plates and the clutch facings disposed between the drive plate and the adjacent driven plate, and the hydraulic pressure piston as well as the hydraulic pressure piston 34. The concrete structure of the reverse drive clutch 14 is described in Patent Document 3 and the like. In the present embodiment, the above-described structure can be adopted as the reverse drive clutch 14. With reference to the clutch hub, the structure of the inner circumferential oil passage of the cylindrical portion is configured in accordance with the present invention. The coolability (cooling property) of the clutch pack from the clutch hub can be enhanced.

Next, the press-molding of the dam of the present invention will be described. FIG. 3 shows the clutch hub before press-molding the dams 76. For distinction of the clutch hub 42 after the press-molding of the dams 76 is completed, the clutch hub before press-molding the dams 76 is referred to as the work W. The projections 74-1 to radial outward and the projections 74-2 to radial inward, which are alternately disposed in the circumferential direction, the depressions (the engagement grooves to the drive plates 46) which are served as the spline grooves 74-3 in the axial direction which are disposed between the adjacent projections 74-1 to radial outward, and the depressions (the oil grooves 74-4) which are disposed between the adjacent projections 74-2 to radial inward have already been formed in the work W. However, the dams 76 are not molded in the work W. When the press-molding is performed, the end portions of the work W which are slightly protruded and are disposed along the outer circumference of the oil grooves 74-4 from the projection 74-1 to radial outward to the projection 74-2 to radial inward are pressed by the punches in the axial direction. The material flowby pressing leads to the formation of the dams 76 in FIG. 2.

Figure 5:
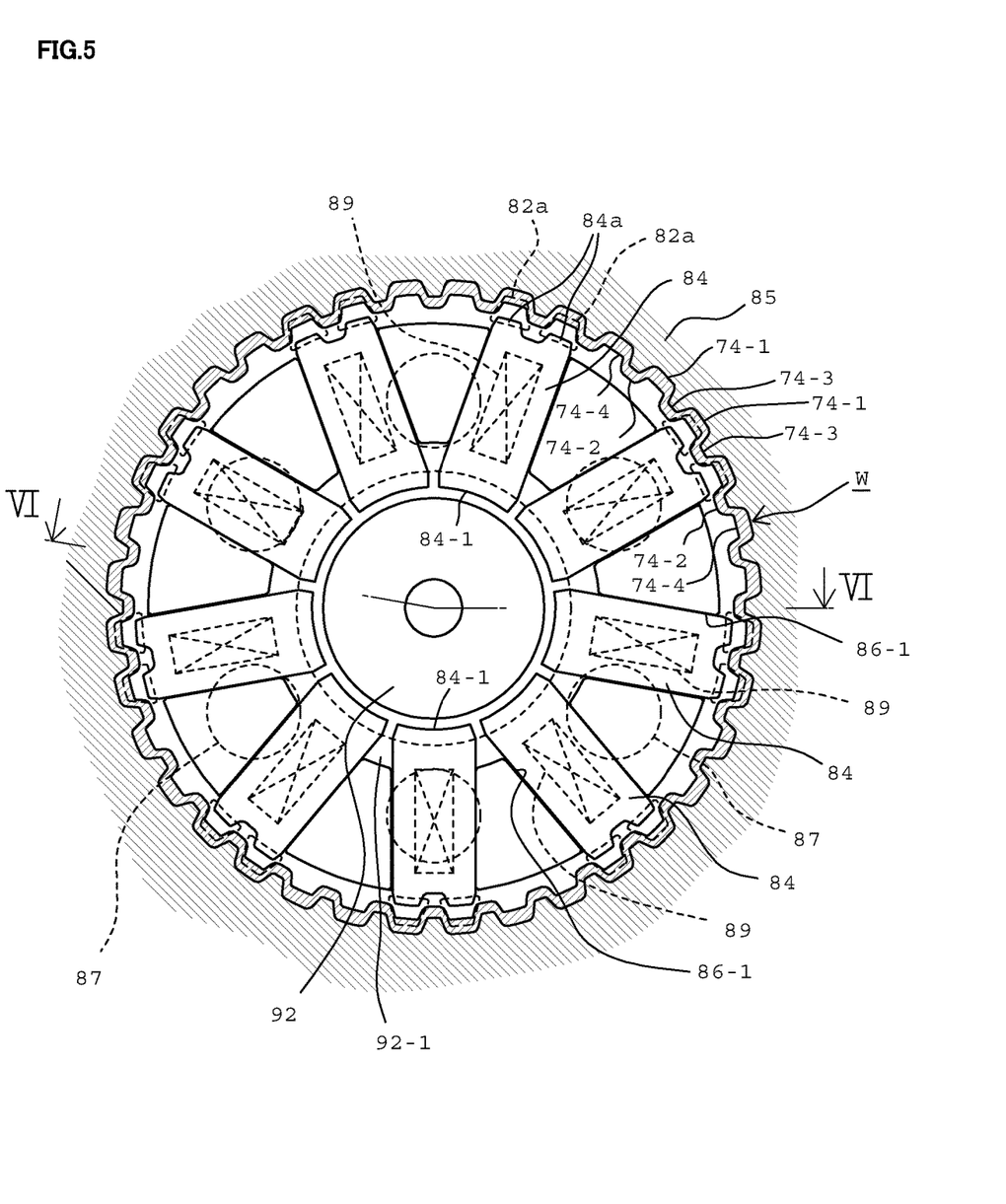
FIG. 5 is a plan view showing a molding apparatus which performs press-molding of the dams by using the work shown in FIG. 3, substantially taken along a line V-V in FIG. 6A.
Figure 6A:
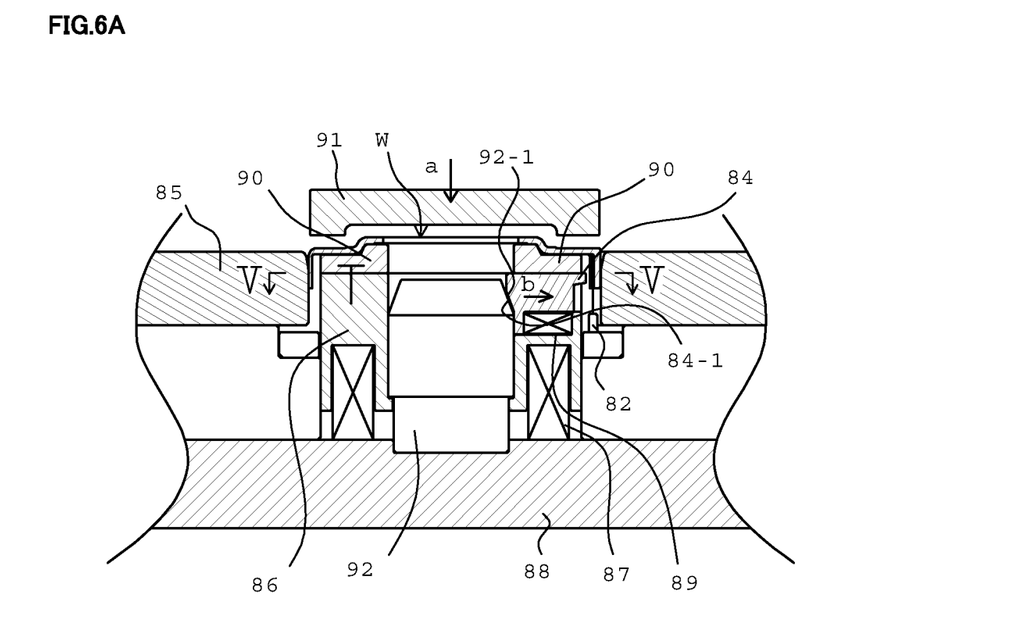
Figure 6B:
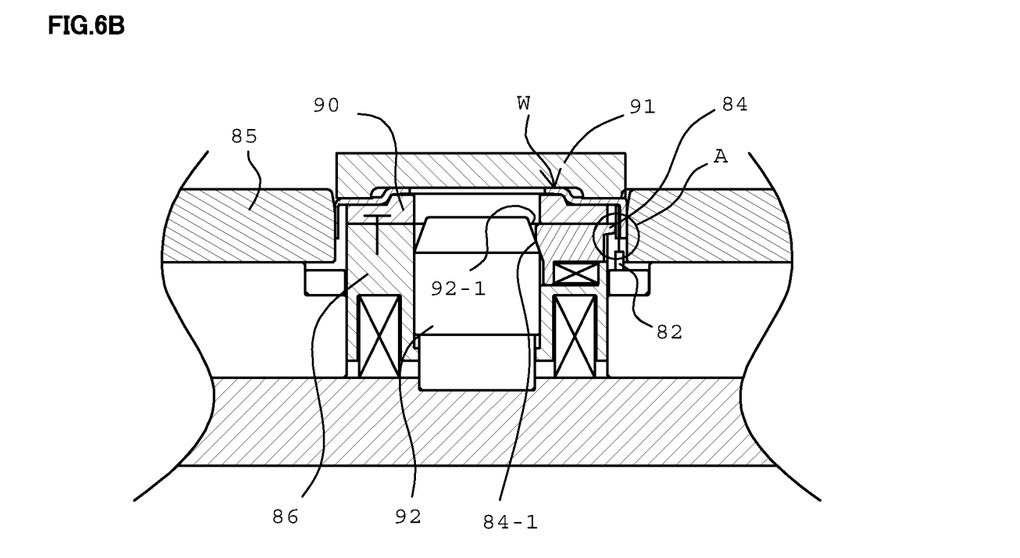

FIGS. 5, 6A and 6B (7A and 7B) show the apparatus for press-molding the dams 76. With reference to FIGS. 5 and 6A, the molding apparatus is in a preparation position for starting the molding. The molding apparatus comprises the plural punches 82 which are spaced in the circumferential direction and moves the axial direction of the work W, the plural inner pressing tools 84 which are spaced in the circumferential direction and moves the radial direction, and the work outer pressing tool 85 that the work W is defined in and is retained in the overall outer circumference. As shown in FIG. 5, the work outer pressing tool 85 comprises the outer circumferential surface which includes the projections 74-1 and the depressions 74-3 which are alternately disposed in the overall outer circumference of the work W (refer to FIG. 3), and the inner circumferential surface which is complementary to the outer circumferential surface. Thereby, the inner circumferential surface of the outer pressing tool 85 is fitted into the projection and depression shape of the outer circumference of the work W. Therefore, the outer circumferential shape of the work W can maintain no deformation while the press process is performed for forming the dams 76. In this connection, the press process for forming the dams is not affected to the outer circumferential shape of the work W.

When press-molding the dams 76 to the end portions of the oil grooves 74-4, the respective inner pressing tools 84 receive the opposite press-molding force from the punches 82 through the dams 76, prevents the sag of the back surface of the dams 76, and achieves the function that the back surface of the dams 76 has the almost upright surface. As shown in FIG. 6A, the inner pressing tools 84 are movably disposed on a die base 86 in the radial direction. The die base 86 is movably mounted on the base 88 through the vertical direction die cushions 87. As shown in FIG. 5, the six vertical direction die cushions 87 are disposed in a circumferential direction with an equal interval. As shown in FIG. 5, the nine inner pressing tools 84 are spacingly disposed in a circumferential direction with an equal interval. The reference numeral 89 denotes radial direction die cushions of the inner pressing tools 84, and the radial direction die cushions 89 are schematically shown in FIG. 5. A work receiving plate 90 is disposed on the die base 86 through the inner pressing tools 84, and the work W is mounted on the work receiving plate 90. A press plate 91 is disposed in a mechanical driving source (not shown) or a hydraulic driving source (not shown) above the work receiving source. The die base 86 comprises the nine radial direction die slide grooves 86-1, and the respective inner pressing tools 84 are movably received in the radial direction die slide grooves 86-1 in the radial direction. As shown in FIGS. 6A and 6B (7C and 7D), a cam driver 92 is uprightly disposed on the base 88 so that the nine inner pressing tools 84 are simultaneously driven in the radial direction. That is, cam drive surfaces 92-1 are formed at a tip of the cam driver 92, and are disposed opposite to cam driven surfaces 84-1 of the respective inner pressing tools 84. When the press plate 91 is driven downwardly (an arrow "a" in FIG. 6A), the respective inner pressing tools 84 move in the radial direction (an arrow "b" in FIG. 6A) by downwardly moving the inner pressing tools 84 to the cam driver 92 through the work W, the work receiving plate 90 and the die base 86. As shown in FIG. 5, in the present embodiment, the respective inner pressing tools 84 comprise branched tips 84a. The punches 82 also comprise branched tips 82a corresponding to the branched tips 84a of the inner pressing tools 84. One of the punches 82 and one of the inner pressing tools 84 are simultaneously involved with the formation of the dams 76 in the two adjacent oil grooves 74-4 in cooperation with the tips 82a and 84a. Accordingly, molding the eighteenth dams 76 of the oil grooves 74-4 (2×9=18) can be performed in one radial direction driving by the cam driver 92. Then, after the die base 86 is rotated, the formation of the dams of the rest oil grooves 74-4 in the work W is performed. That is, the dam formation of the work W is completed in two processes. By performing the configuration modification that the number of the tips 84a disposed at one of the inner pressing tools 84 increases twice or the like, molding the dams 76 of all the oil grooves 74-4 in the work can be completed in one process. Hereinafter, for simplification, the molding operation of the dams 76 will be described as the operation that one dam 76 is molded in cooperation with the punch 82 and the inner pressing tool 84.

The operation of the molding apparatus will be described. As shown in FIG. 6A, the press plate 91 is in a retreated position upwardly, and the work W is mounted on the die base 86. The die base 86 is in a most lifted position by the upward spring force of the die cushion 87. The position relationship between the cam driver 92 and the inner pressing tool 84 is in an innermost radial position by the radial direction spring force of the corresponding die cushion 89, and the inner pressing tool 84 is spaced from the inner circumferential surface of one oil groove 74-4 of the work W. The punch 82 is also spaced from the end surface of the clutch hub. The press plate 91 starts to move downwardly from the above position (the arrow "a") for molding the dam.

In the process (b), the press plate 91 downwardly moves to a position abutted to the work W. The die base 86 and the inner pressing tool 84 on the die base 86 downwardly move against the die cushion 87 through the work receive plate 90. Since the engagement between the cam drive surface 92-1 and the cam driven surface 84-1 is gradually tightened, the inner pressing tool 84 starts to move in the radial outward direction against the spring force of the die cushion 87.

The process (c) shows a state that the press plate 91 is further moved downwardly, the inner pressing tool 84 is abutted to the opposite surface of the work W (the bottom surface of the oil groove 74-4), and the punch 82 is also abutted to the end surface of the work W.

The process (d) shows a position of the press plate 91 when the press process is completed. The punch 82 presses the end surface of the work W. Thereby, the material of the end surface of the work W is plastic-flown to radial inward and then the dam is formed.

For performing the subsequent press process of the work W after the dam is molded, the press plate 91 is lifted to the initial position in the process (a). The die base 86, the inner pressing tool 84 and the work receiving plate 90 are lifted to the initial position (an arrow "a'" in FIG. 7D) in the process (a) by the elastic force of the vertical die cushion 87. Then, the inner pressing tool 84 is retreated to the initial position in the process (a) by the elastic force of the radial die cushion 89.

Figures 8A, 8B:
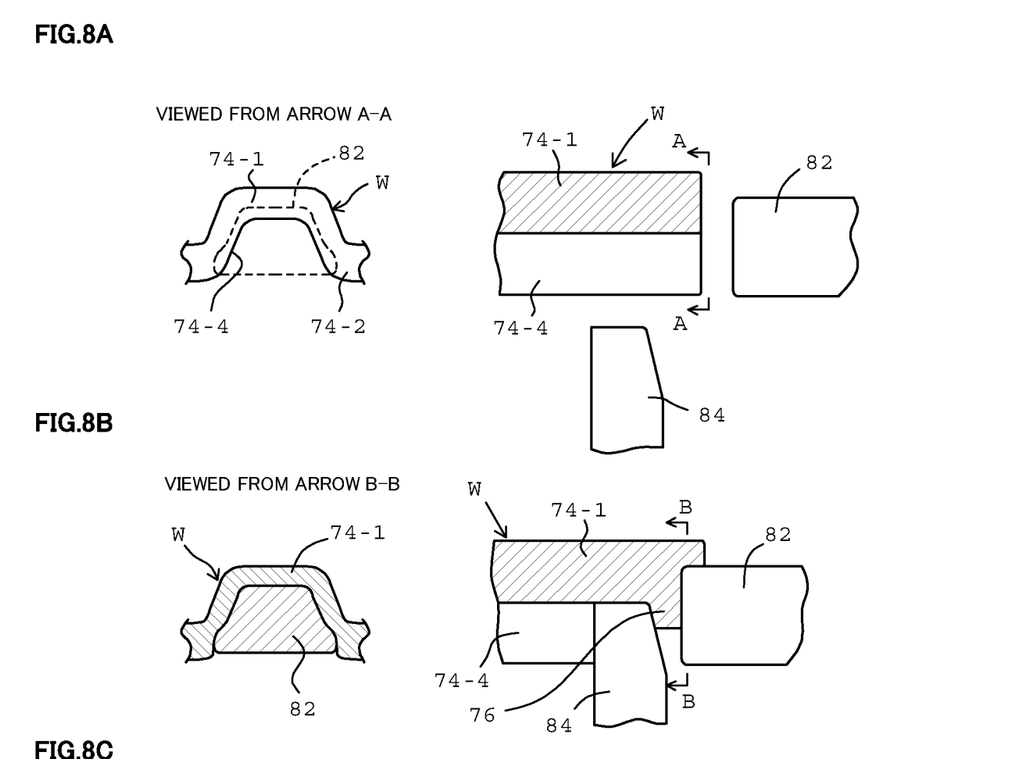
Figure 8C:
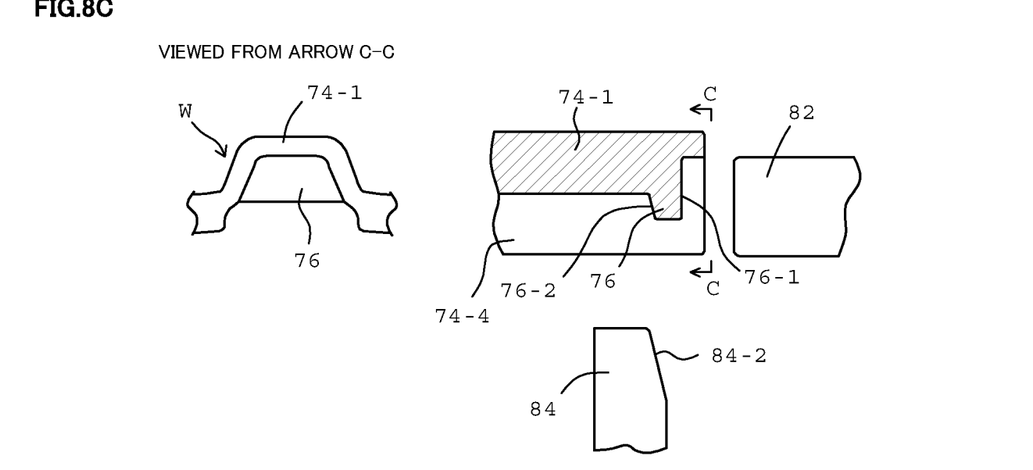

FIGS. 8A, 8B and 8C schematically show one oil groove 74-4 with reference to the formation of the dams by the press-molding apparatus. FIG. 8A shows a state just before molding the dam. The punch 82 and the inner pressing tool 84 are spaced from the work W, and the punch 82 is oppositely positioned to the projection to radial outward of the work W and the end portion of the oil groove 74-4 which is disposed at an interior side of the projection 74-1. FIGS. 8A, 8B and 8C are substantially corresponding to the portion which is shown by a circle "A" in FIG. 6B, and show the position relationship of the punch 82 and the inner pressing tool 84 to the work W in a state that the position relationship of FIG. 6B is rotated by 90 [deg] in a counterclockwise direction.

Figure 7C:
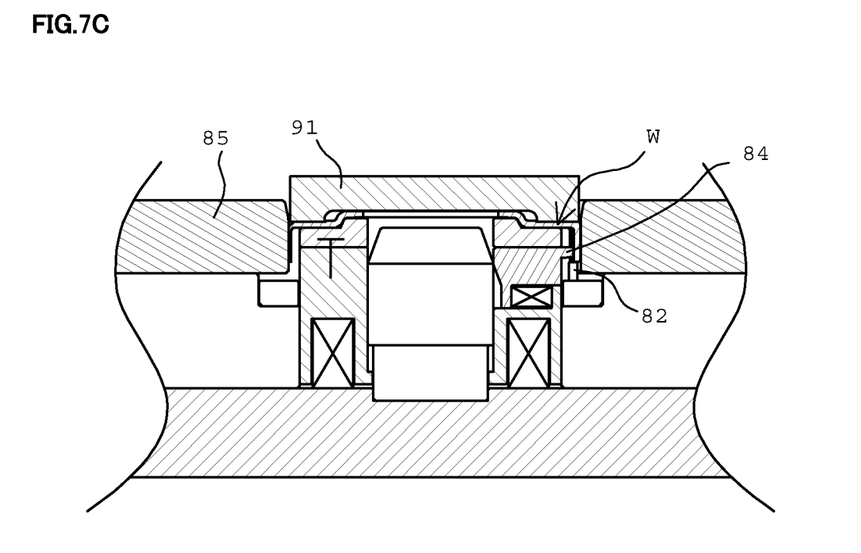
Figure 7D:
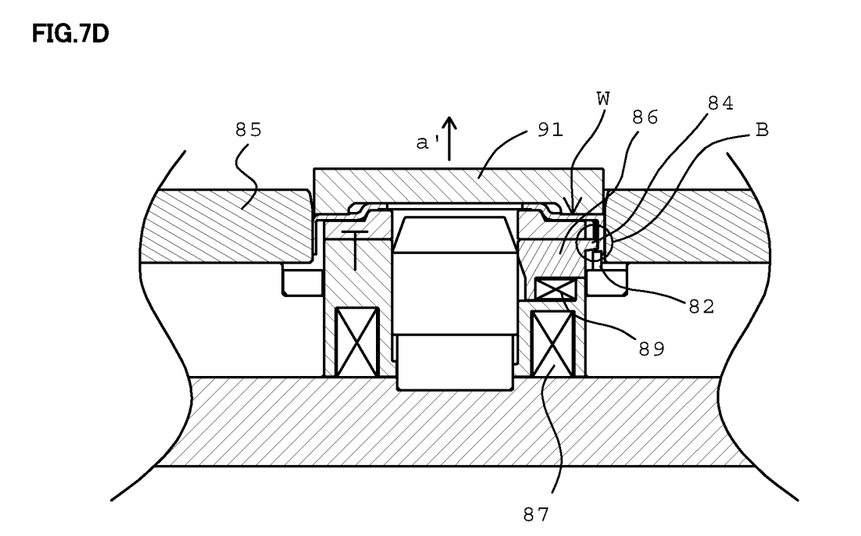

FIG. 8B shows a state that the inner pressing tool 84 is abutted to the bottom surface of the groove and the end surface of the work W is pressed by the punch 82 (The above portion is substantially corresponding to the portion which is shown by a circle "B" in FIG. 7D.). Since the work W is constrained to the pressing direction (to a left and right direction in FIG. 8B) and is constrained to the outer pressing tool 85 to radial outward (to an upper direction in FIG. 8B), the material of the end surface of the work W which is pressed by the punch 82 is plastic-flown to radial inward (to a lower direction in FIG. 8B) and then the dam 76 is formed. Since the inner pressing tool 84 is positioned at the opposite side of the punch 82 via the dam 76, the sag of the material can be prevented.

FIG. 8C shows a state that the formation of the dam is completed and the punch 82 and the inner pressing tool 84 are retreated. It is understood that the molding of the dam 76 which is integrated with the inner side surface is performed at the both side. The portion of the dam 76 where the punch 82 is hit is the upright front surface 76-1, and the steep back surface 76-2 which is substantially a shape of the abutment surface 84-2 that the work W is abutted to the inner pressing tool 84, is formed at the back surface side of the dam 76. As described in the explanation of FIG. 4, it is preferred that the surface 76-2 be substantially the upright surface. When the angle is near 90 [deg], the smooth retreat of the inner pressing tool 84 using only the spring force of the radial direction die cushion 89 can be interfered due to biting to the work W. Therefore, the limit value of the inclined angle (an angle θ in FIG. 4) of the back surface 76-2 of the dam 76 becomes an angle that the smooth retreat motion of the inner pressing tool 84 is interfered by the back surface 76-2.

As shown in an arrow diagram taken along a line A-A of FIG. 8A, the oil groove 74-4 is positioned at an interior of the projection 74-1 of the work W. The end surface shape of the punch 82 is substantially similar to those of the projection 74-1 and the oil groove 74-4, is slightly smaller than that of the projection 74-1 and is slightly larger than that of the oil groove 74-4. The size relationship is appropriately designed so that the required flow of the material is obtained for forming the dam 76 by pressing by means of the punch 82.

Further, in the press-molding of the dam 76 by the punch, the inner circumferential shape of the work W, in particular, the shape of the oil groove 74-4 in the proximate portion of the dam 76 is varied. However, in the pressing process, the work W is held in the overall outer circumference by the outer pressing tool 85 (FIG. 5) which has an even shape and is complementary to the outer circumferential surface of the work W. The outer circumferential surface of the work W maintains its shape without the change in spite of performing the pressing process of the dam 76.

Figure 9A:
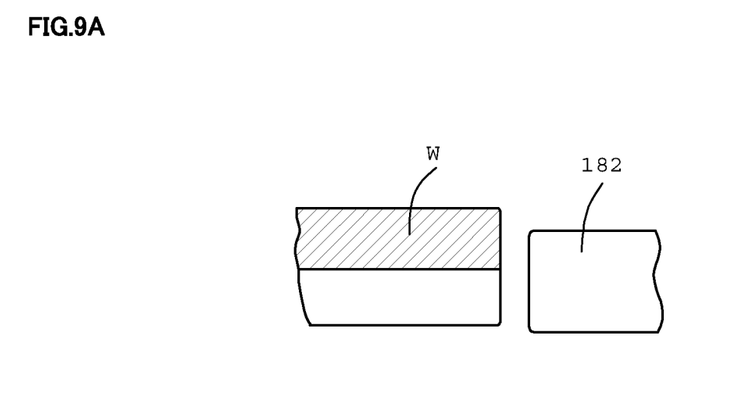
Figure 9B:
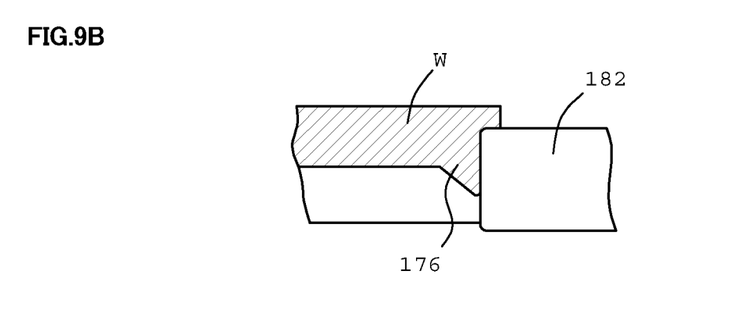
Figure 9C:
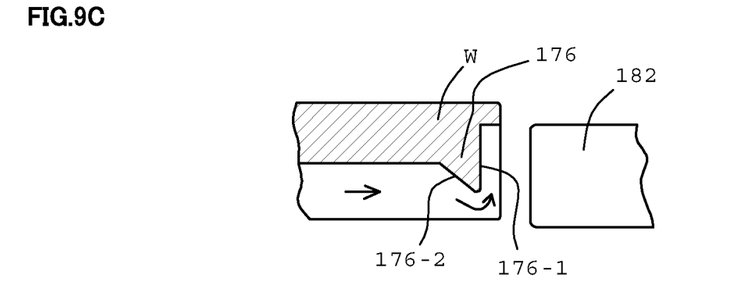

FIGS. 9A to 9C schematically explain the press-molding of the dam to the work W in Patent Document 1, in comparison with FIGS. 8A to 8C in the present invention. In Patent Document 1, using the punch 182 at the front surface side is the same as the present invention, but the back surface side is a free portion. Therefore, since the flow of the material when pressing by the punch 182 is not controlled, the dam 176 which is formed by the press-molding is stood up on the front surface 176-1, but the back surface 176-2 is sagged. Because the retention effect of the lubricant oil by the dam 176 is inadequate (that is, the flow of the oil easily climbs over the dam 176 as shown by the arrow in FIG. 9C), the adequate cooling cannot be performed. In contrast, in the present invention, since the back surface 76-2 of the dam 76 is a molding surface formed by the inner pressing tool 84, the back surface 76-2 can be steep and the adequate retention effect of the flow of the clutch oil in the oil groove 74-4 can be obtained (FIG. 4).

Figure 10:
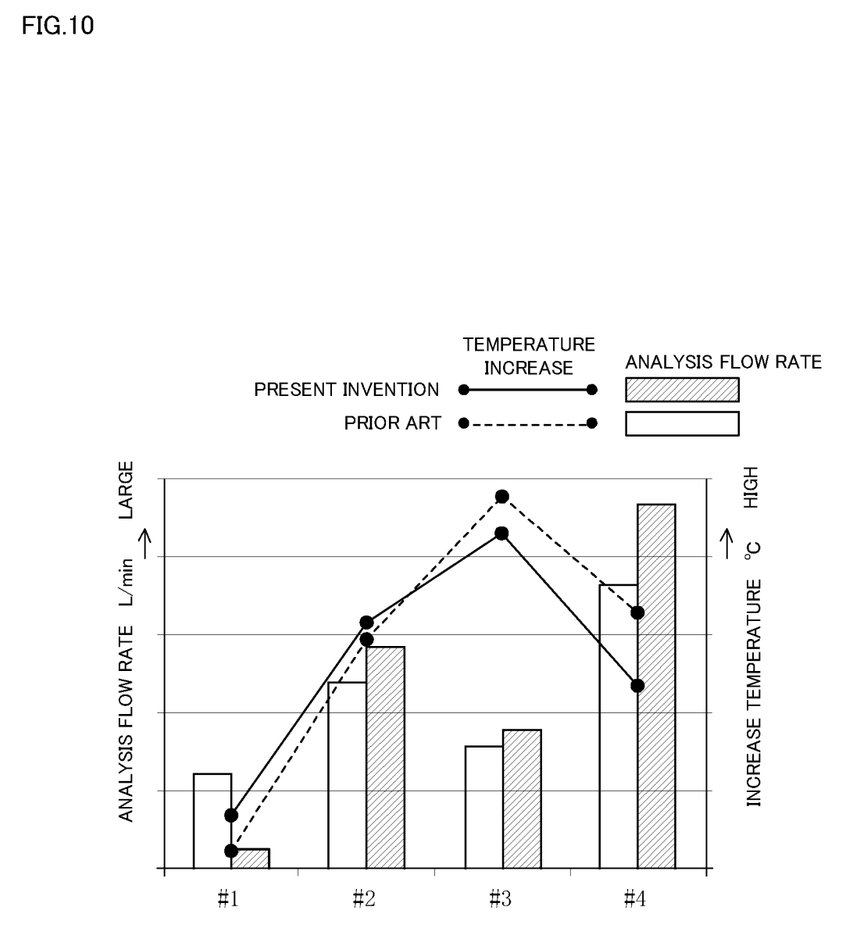
FIG. 10 is a schematic graph showing an increase temperature (a line graph) and a simulation result of a flow rate (a bar graph) in a slip mode, in four driving plates (shown by #1, #2, #3 and #4) installed in the clutch hub of FIG. 1 from a depth side to a front side.

FIG. 10 shows a temperature measurement result (a line graph) of the drive plate 46 and the simulation result (a bar graph) of the flow rate passing the oil groove 74-4, in the clutch pack 44 in the slip mode in comparison with the present invention and the prior art. As shown in FIG. 1, the four drive plates 46 are disposed. In FIG. 1, the reference numerals #1, #2, #3 and #4 denote the four drive plate 46 from the left to the right (from the plate portion 72 to the spacing side). In FIG. 1, the setting positions of the thermocouples for the temperature measurement are shown by black circles. In #3 and #4 of the drive plates 46 disposed at the spacing side from the plate portion 72, which have a temperature increase problem, the remarkable effect for suppressing the temperature increase can be obtained. Even in the simulation result of the flow rate, an advantageous effect by the structure of the dam 76 in the present invention can be seen.

EXPLANATION OF REFERENCE NUMERALS 10 forward-reverse switching mechanism
12 forward drive clutch
14 reverse drive clutch
16 planetary gear mechanism
18 sun gear
20 ring gear
22 planetary gear
28 carrier
32 clutch drum
34 hydraulic pressure piston
36 return spring
40 spring receiving plate
42 clutch hub (a cylindrical component for holding clutch plates of the present invention
44 clutch pack
46 drive plate
48 driven plate
50, 52 clutch facing (clutch plates of the present invention comprise drive plates 46 and clutch facings 50 and 52.)
61 drum support portion
62 hydraulic pressure chamber
64 hydraulic oil port
66 hydraulic oil passage
72 plate portion of a clutch hub 74 cylindrical portion of a clutch hub
74-1 projection to radial outward in a plate portion of a clutch hub
74-2 projection to radial inward in a plate portion of a clutch hub
74-3 spline groove in a plate portion of a clutch hub
74-4 oil groove in a plate portion of a clutch hub
74-5 oil hole in a plate portion of a clutch hub dam
76-1 front surface of a dam (a molding surface by a punch)
76-2 back surface of a dam (a molding surface by an inner pressing tool)
canceller chamber
82 punch
82a tip of a punch
84 inner pressing tool of a work
84-1 cam driven surface
84a tip of an inner pressing tool
86 die base
87 vertical direction die cushion
88 base
90 work receiving plate
91 press plate
92 cam driver
92-1 cam drive surface of a cam driver

The invention claimed is:

1. A cylindrical component for holding clutch plates which is formed by press-molding a steel sheet, comprising:
    a plate portion extended in a radial direction against a rotational shaft; and
    a cylindrical portion extended from said plate portion to an axial direction,
    wherein said cylindrical portion alternately forms projections to radial outward which are extended to a longitudinal direction, and projections to radial inward which are extended to said longitudinal direction, in a circumferential direction,
    wherein, in an outer circumference of said cylindrical portion, depressions extended in said longitudinal direction between adjacent projections to radial outward are engaged with projections in an inner circumference of said clutch plates so that said clutch plates slidably move in said longitudinal direction,
    wherein, in an inner circumference of said cylindrical portion, depressions extended in said longitudinal direction between adjacent projections to radial inward are formed as oil grooves for circulating cooling oil of said clutch plates,
    wherein said cylindrical portion comprises dams as a press-molding portion which are spaced from said plate portion and are slightly spaced from an end portion of said cylindrical portion of a spacing side to said plate portion side, integrating bottom surfaces and both side surfaces of said oil grooves with said dams, and are extended to radial inward,
    wherein said dams have a steep shape so as to retain said oil which is circulated on said oil grooves in a back surface side,
    wherein said dams comprise a front surface and a back surface which are a molding surface abutted to a molding tool when press-molding said dams, and
    wherein an angle of a molding surface of said back surface side of said dams is in a range between 90 [deg] to 100 [deg] for a reference line parallel to a center line of said cylindrical component when said angle is measured from an exterior of said clutch hub to an interior.

2. The cylindrical component for holding clutch plates according to claim 1,
    wherein said molding surface of said back surface side of said dams has a steep shape as long as attaching and detaching an inner pressing tool is not prevented after said press-molding is performed.

3. A method for press-molding dams in the cylindrical component for holding clutch plates according to claim 1, the method comprising:
    preparing a work which comprises a plate portion, and a cylindrical portion (i) which is extended from said plate portion to an axial direction, (ii) alternately forms projections to radial outward which are extended to a longitudinal direction and projections to radial inward which are extended to said longitudinal direction, in a circumferential direction, and (iii) includes depressions extended in said longitudinal direction between said adjacent projections to radial outward for being engaged with said clutch plates, and (iv) includes depressions extended in said longitudinal direction between said adjacent projections to radial inward, which serve as oil grooves;
    holding said work on an outer circumference by an outer pressing tool having an inner circumferential shape which is complementary to said outer circumference of said work;
    setting punches which are disposed opposite to said axial direction against an end surface of said cylindrical portion from an exterior, and inner pressing tools which are disposed opposite to a radial direction toward bottom surfaces of said oil grooves;
    abutting said inner pressing tools to said bottom surfaces of said oil grooves;
    pressing said cylindrical portion from said end surface to said axial direction by said punches; and
    flowing a material of said work between each of said punches and each of said inner pressing tools.

4. The method according to claim 3,
    wherein a molding surface of a back surface side of said dams has a steep shape as long as detaching said inner pressing tool to radial inward is not prevented after said press-molding is performed.

5. The method according to claim 4,
    wherein an angle of said molding surface of said back surface side of said dams is in a range from 90 [deg] to 100 [deg] for a reference line parallel to a center line of said cylindrical component when said angle is measured from an exterior of said clutch hub to an interior.

* * * * *